(12) United States Patent
Patierno et al.

(10) Patent No.: US 10,992,620 B2
(45) Date of Patent: *Apr. 27, 2021

(54) METHODS, SYSTEMS, AND MEDIA FOR GENERATING A NOTIFICATION IN CONNECTION WITH A VIDEO CONTENT ITEM

(71) Applicant: Google LLC, Mountain View, CA (US)

(72) Inventors: David Patierno, San Francisco, CA (US); Jokubas Zukerman, San Francisco, CA (US); Christopher Cooke, Mountain View, CA (US); Tomer Margolin, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,015

(22) Filed: Jun. 10, 2019

(65) Prior Publication Data

US 2019/0297041 A1 Sep. 26, 2019

Related U.S. Application Data

(63) Continuation of application No. 15/377,369, filed on Dec. 13, 2016, now Pat. No. 10,320,728.

(51) Int. Cl.
*H04L 12/58* (2006.01)
*H04L 29/08* (2006.01)

(52) U.S. Cl.
CPC .............. *H04L 51/10* (2013.01); *H04L 51/24* (2013.01); *H04L 67/26* (2013.01)

(58) Field of Classification Search
CPC .......... H04L 51/10; H04L 51/24; H04L 67/26
See application file for complete search history.

(56) References Cited

U.S. PATENT DOCUMENTS

| | | | |
|---|---|---|---|
| 7,383,310 B1 | 6/2008 | Lyle et al. |
| 8,230,343 B2 | 7/2012 | Logan et al. |
| 8,606,297 B1 | 12/2013 | Simkhai et al. |
| 8,687,121 B2 | 4/2014 | Watanabe et al. |
| 8,838,696 B2 | 9/2014 | Tiwari et al. |

(Continued)

OTHER PUBLICATIONS

Notice of Allowance dated Jan. 30, 2019 in U.S. Appl. No. 15/377,369.
Office Action dated Sep. 13, 2018 in U.S. Appl. No. 15/377,369.

*Primary Examiner* — Blake J Rubin
(74) *Attorney, Agent, or Firm* — Byrne Poh LLP

(57) ABSTRACT

Methods, systems, and media for generating a notification in connection with a video content item are provided. In some embodiments, the method comprises: causing a video content item and a message interface to be presented on a plurality of user devices, wherein the video content item is created by a content creator; receiving, from at least a portion of the plurality of user devices, a plurality of messages via the message interface; identifying at least one topic included in a portion of the plurality of messages within a given period of time; causing a notification that indicates the at least one topic to be superimposed on the presentation of the video content item on the plurality of user devices; determining that the at least one topic is no longer included in more than a predetermined number of the plurality of messages; and causing presentation of the notification to be inhibited on the plurality of user devices.

17 Claims, 5 Drawing Sheets

(56) References Cited

U.S. PATENT DOCUMENTS

| | | | |
|---|---|---|---|
| 8,843,510 B2 | 9/2014 | Newell et al. | |
| 9,094,726 B2 | 7/2015 | Roberts et al. | |
| 9,191,615 B1 | 11/2015 | Valimaki et al. | |
| 9,467,718 B1* | 10/2016 | Newell | G11B 27/036 |
| 9,467,750 B2 | 10/2016 | Banica et al. | |
| 2007/0245243 A1* | 10/2007 | Lanza | H04N 21/4788 |
| | | | 715/723 |
| 2008/0120501 A1 | 5/2008 | Jannink et al. | |
| 2009/0172150 A1 | 7/2009 | Alkov et al. | |
| 2009/0248637 A1 | 10/2009 | Yamasaki et al. | |
| 2010/0169786 A1* | 7/2010 | O'Brien | G11B 27/034 |
| | | | 715/738 |
| 2010/0205541 A1* | 8/2010 | Rapaport | G06F 16/285 |
| | | | 715/753 |
| 2013/0007661 A1 | 1/2013 | Klappert et al. | |
| 2013/0173531 A1 | 7/2013 | Rinearson et al. | |
| 2013/0227420 A1 | 8/2013 | Pasquero et al. | |
| 2013/0297705 A1 | 11/2013 | Arora et al. | |
| 2013/0326352 A1* | 12/2013 | Morton | G06F 3/0484 |
| | | | 715/719 |
| 2014/0013200 A1* | 1/2014 | White | H04N 21/4788 |
| | | | 715/230 |
| 2014/0146052 A1* | 5/2014 | Takamura | G06F 13/00 |
| | | | 345/440 |
| 2014/0188997 A1* | 7/2014 | Schneiderman | H04L 51/10 |
| | | | 709/204 |
| 2014/0218461 A1* | 8/2014 | DeLand | G10L 15/08 |
| | | | 348/14.07 |
| 2014/0310365 A1* | 10/2014 | Sample | H04L 51/16 |
| | | | 709/206 |
| 2015/0089399 A1* | 3/2015 | Megill | G06Q 30/0203 |
| | | | 715/753 |
| 2015/0142888 A1* | 5/2015 | Browning | G06F 16/285 |
| | | | 709/204 |
| 2016/0248853 A1* | 8/2016 | Chiu | H04L 51/24 |
| 2016/0277802 A1* | 9/2016 | Bernstein | H04N 21/4307 |
| 2017/0142044 A1* | 5/2017 | Ball | G06Q 50/01 |
| 2017/0220579 A1* | 8/2017 | Kazi | G06F 40/284 |
| 2018/0075128 A1* | 3/2018 | Srinivasan | G06Q 30/0201 |
| 2018/0143950 A1 | 5/2018 | al-Arnaouti et al. | |
| 2018/0145936 A1* | 5/2018 | Geng | H04L 51/34 |
| 2018/0176661 A1 | 6/2018 | Varndell et al. | |
| 2020/0322688 A1* | 10/2020 | Lehtiniemi | G06Q 50/01 |

\* cited by examiner

METHODS, SYSTEMS, AND MEDIA FOR GENERATING A NOTIFICATION IN CONNECTION WITH A VIDEO CONTENT ITEM

CROSS-REFERENCE TO RELATED APPLICATION

This application is a continuation of Unites States patent application Ser. No. 15/377,369, filed Dec. 13, 2016, which is hereby incorporated by reference herein in its entirety.

TECHNICAL FIELD

The disclosed subject matter relates to methods, systems, and media for generating a notification in connection with a video content item.

BACKGROUND

Many video content creators provide live video streams for viewing by multiples users. Presentation of these live video streams is often through a video content platform that allows the viewers of the content to chat with each other (e.g., through instant messages) while viewing the live video stream. In situations where there are many viewers chatting with each other rapidly, it can be difficult to keep track of the messages, both for a creator of the live video stream and for viewers of the video content.

Accordingly, it is desirable to provide methods, systems, and media for generating a notification in connection with a video content item.

SUMMARY

Methods, systems, and media for generating a notification in connection with a video content item are provided.

In accordance with some embodiments of the disclosed subject matter, a method for generating a notification in connection with a video content item is provided, the method comprising: causing a video content item and a message interface to be presented on a plurality of user devices, wherein the video content item is created by a content creator; receiving, from at least a portion of the plurality of user devices, a plurality of messages via the message interface; identifying at least one topic included in a portion of the plurality of messages within a given period of time; causing a notification that indicates the at least one topic to be superimposed on the presentation of the video content item on the plurality of user devices; determining that the at least one topic is no longer included in more than a predetermined number of the plurality of messages; and causing presentation of the notification to be inhibited on the plurality of user devices.

In some embodiments, a plurality of topics from the plurality of messages are identified within the given period of time and wherein the method further comprises causing a creator interface to be presented on a user device associated with the content creator, wherein at least a subset of the plurality of topics are presented within the creator interface.

In some embodiments, method further comprises receiving a selection, via the creator interface, from the content creator, of the notification from the plurality of messages.

In some embodiments, the method further comprises ranking the plurality of topics that are presented within the creator interface based on message popularity.

In some embodiments, identifying the at least one topic further comprises determining that a keyword is included in more than the predetermined number of the plurality of messages.

In some embodiments, the method further comprises storing metadata indicating the content of the notification that indicates the at least one topic and a portion of the video content item during which the notification is to be superimposed on the video content item.

In some embodiments, the method further comprises determining a size of a visual representation of the notification based on a number of the plurality of messages that include the at least one topic.

In some embodiments, the notification indicates a number of the plurality of messages that include the at least one topic.

In some embodiments, causing the notification to be superimposed on the presentation of the video content item further comprises generating a composite video content item that includes the notification.

In some embodiments, a system for generating a notification in connection with a video content item is provided, the system comprising: a hardware processor that is programmed to: cause a video content item and a message interface to be presented on a plurality of user devices, wherein the video content item is created by a content creator; receive, from at least a portion of the plurality of user devices, a plurality of messages via the message interface; identify at least one topic included in a portion of the plurality of messages within a given period of time; cause a notification that indicates the at least one topic to be superimposed on the presentation of the video content item on the plurality of user devices; determine that the at least one topic is no longer included in more than a predetermined number of the plurality of messages; and cause presentation of the notification to be inhibited on the plurality of user devices.

In some embodiments, a non-transitory computer-readable medium containing computer executable instructions that, when executed by a processor, cause the processor to perform a method for generating a notification in connection with a video content item is provided, the method comprising: causing a video content item and a message interface to be presented on a plurality of user devices, wherein the video content item is created by a content creator; receiving, from at least a portion of the plurality of user devices, a plurality of messages via the message interface; identifying at least one topic included in a portion of the plurality of messages within a given period of time; causing a notification that indicates the at least one topic to be superimposed on the presentation of the video content item on the plurality of user devices; determining that the at least one topic is no longer included in more than a predetermined number of the plurality of messages; and causing presentation of the notification to be inhibited on the plurality of user devices.

In some embodiments, a system for generating a notification in connection with a video content item is provided, the system comprising: means for causing a video content item and a message interface to be presented on a plurality of user devices, wherein the video content item is created by a content creator; means for receiving, from at least a portion of the plurality of user devices, a plurality of messages via the message interface; means for identifying at least one topic included in a portion of the plurality of messages within a given period of time; means for causing a notification that indicates the at least one topic to be superimposed on the presentation of the video content item on the plurality of user devices; means for determining that the at least one topic is no longer included in more than a predetermined number of the plurality of messages; and means for causing presentation of the notification to be inhibited on the plurality of user devices.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1A:
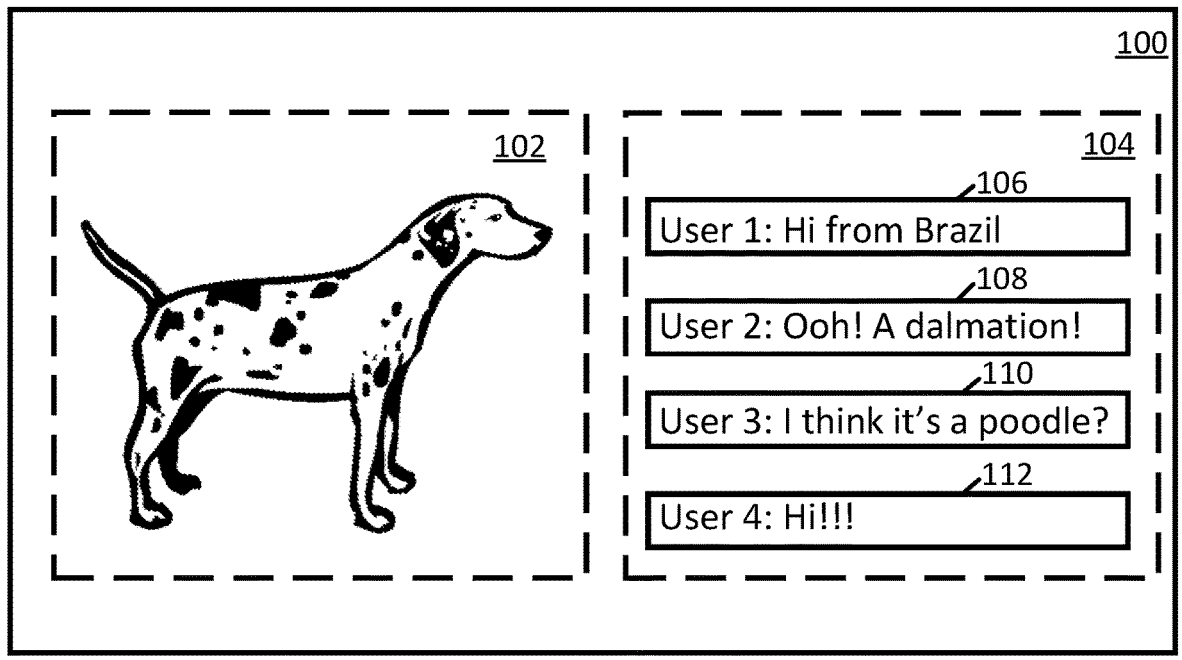
FIGS. 1A and 1B show illustrative examples of user interfaces that present messages in connection with a video content item and a notification embedded in the video content item in accordance with some embodiments of the disclosed subject matter.

In accordance with various embodiments, mechanisms (which can include methods, systems, and media) for generating a notification in connection with a video content item are provided.

In some embodiments, the mechanisms described herein can cause a video content item to be presented on one or more user devices. In some embodiments, a message interface can additionally be presented in connection with the video content item on the one or more user devices, and users of the user devices can transmit and receive messages (e.g., chat messages, instant messages, text messages, and/or any other suitable type of message) via the message interface. In some embodiments, the mechanisms described herein can analyze the content of the messages and can identify currently popular topics, keywords, and/or sentiments in the received messages. For example, the mechanisms can determine that many users have expressed in messages that the video content is interesting, exciting, boring, untrue, and/or any other suitable sentiment. As another example, in some embodiments, the mechanisms can determine that many users have expressed interest in a particular topic related to the video content. As yet another example, in some embodiments, the mechanisms can determine that many users are posting links to particular articles or websites in messages. The mechanisms can then generate a notification related to the identified topic, theme, or sentiment to be presented in connection with presentation of the video content item. For example, in some embodiments, the mechanisms described herein can cause the notification to be superimposed on the video content item. Note that, in some embodiments, the notification can include any suitable content, such as text (e.g., commonly occurring text in multiple messages, and/or any other suitable text), links (e.g., links to a website related to a currently popular topic, links to news articles, and/or any other suitable links), visual content (e.g., animations, graphics, icons, emojis, animations, memes, and/or any other suitable visual content), and/or any other suitable content. Additionally, note that the notification can be presented for any suitable duration of time.

In some embodiments, the mechanisms described herein can present results of an analysis of the messages to a creator of the video content item. For example, in some embodiments, the mechanisms can indicate to the creator of the video content item currently popular topics, keywords, and/or sentiments that are common to multiple messages. In some embodiments, the creator of the video content item can use the presented results to generate the notification. For example, in some embodiments, the creator of the video content item can generate a notification that indicates an identified popular topic, keyword, and/or sentiment. As another example, in some embodiments, the results can indicate a particular message that has generated enthusiasm with other viewers (e.g., based on a number of endorsements associated with the message), and can flag the particular message for the creator of the video content item. In some embodiments, the creator of the video content item can select a particular message and can cause the particular message to be highlighted as a notification embedded within and/or superimposed on the video content item.

Note that, in some embodiments, the video content item can be any suitable type of video content, such as a live-streamed broadcast of an event, a television program, a movie, and/or any other suitable type of video content. In some embodiments, metadata related to notifications can be stored in association with an identifier of the video content item. For example, in some embodiments, the metadata can indicate content of the notifications, positions of the notifications, temporal portions of the video content item during which the notifications are presented, and/or any other suitable information. The metadata can then be used to present notifications during future presentations of the video content item. For example, in instances where the video content includes live-streamed video content, the metadata can be used to present the notifications during future presentations of the video content after the live-streamed event has finished.

The mechanisms described herein can be used in different applications. For example, in instances where many users are transmitting messages in rapid succession, the mechanisms described herein can identify common themes or sentiments through the messages and can highlight the common themes both to a creator of the video content and to other viewers. Additionally, in some embodiments, notifications can be presented superimposed on the video content item when the video content is being viewed in a full-screen mode, thereby allowing popular and/or important themes in messages to be presented even if the message interface is not visible to a particular viewer.

Turning to FIG. 1A, an illustrative example of a user interface 100 for presenting a video content item in connection with a message interface is shown in accordance with some embodiments of the disclosed subject matter. As illustrated, in some embodiments, user interface 100 can include video content 102 and message interface 104.

In some embodiments, video content 102 can include any suitable type of video content, such as live streamed video content, a television program, a movie, and/or any other suitable type of video content. In some embodiments, video content 102 can be presented in any suitable manner. For example, in some embodiments, video content 102 can be presented within a video player window that can include any suitable controls, such as a pause button, a volume control, rewind and/or fast-forward controls, and/or any other suitable controls. Note that the position of video content 102 in user interface 100 is shown as an example, and video content 102 can be located at any suitable position. Additionally, in some embodiments, video content 102 can be presented in a full-screen mode.

Message interface 104 can be any suitable user interface for receiving and presenting messages received from multiple user devices. For example, as shown in FIG. 1A, message interface 104 can include individual messages 106-112, which can each be received from a different user device presenting video content 102. In some embodiments, newly received messages can be presented in any suitable manner within message interface 104. For example, in some embodiments, new messages can be presented at a bottom portion of message interface 104, causing older messages to scroll up within message interface 104 and further causing the oldest messages within message interface 104 to be removed from message interface 104. Note that the position of message interface 104 within user interface 100 and with respect to video content 102 is shown as an example, and message interface 104 can be presented at any suitable position. For example, in some embodiments, message interface 104 can be overlaid on video content 102.

Figure 1B:
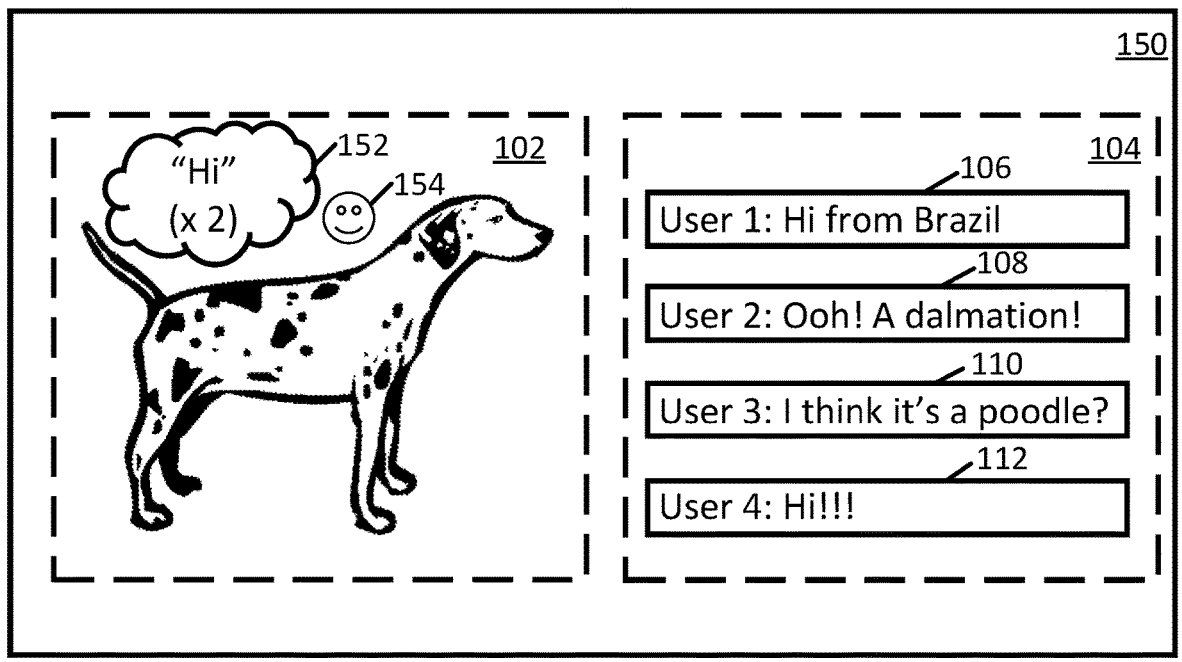

Turning to FIG. 1B, an example 150 of a user interface for presenting a notification based on the messages embedded in or superimposed on video content 102 is shown in accordance with some embodiments of the disclosed subject matter. In some embodiments, the mechanisms described herein can analyze the content of individual messages 106-112 and can then generate a notification 152 that is superimposed on video content 102 as shown in FIG. 1B. As shown in FIG. 1B and described below in connection with FIG. 5, notification 152 can indicate or describe a common topic, theme, sentiment, and/or keyword associated with individual messages 106-112. For example, in some embodiments, notification 152 can indicate a common topic, theme, sentiment, and/or keyword included in multiple messages received from multiple users. Note that techniques for analyzing the content of individual messages 106-112 and generating notification 152 based on the results of the analysis of messages 106-112 are shown in and described below in connection with FIG. 5, and, in some embodiments, can include input from a creator of video content 102, as shown in and described below in connection with FIGS. 2A and 2B.

In some embodiments, notification 152 can include any suitable content. For example, as shown in FIG. 1B, notification 152 can include content (e.g., text, icons, animations, graphics, emojis, links, and/or any other suitable content) that indicates a most commonly received message. Additionally, as shown in FIG. 1B, notification 152 can indicate a number of received messages that correspond to notification 152. In the example shown in FIG. 1B, notification 152 can indicate that two messages (message 106 and message 112) include the text "hi" through the text "×2."

In some embodiments, any suitable images, graphics, animations, icons, and/or any other suitable content can additionally or alternatively be embedded in and/or superimposed on video content 102. For example, as shown by icon 154 in FIG. 1B, in some embodiments, an emoji or other image can be embedded in and/or superimposed on video content 102. In some embodiments, the emoji or other image can be selected by a creator of video content 102. Additionally or alternatively, in some embodiments, a suitable emoji or other image can be identified by the mechanisms described herein and can be suggested to the creator of video content 102, as described below in connection with FIG. 5. Note that, in some embodiments, icon 154 can be included in notification 152.

In some embodiments, notification 152 and/or icon 154 can be presented for any suitable duration of time (e.g., five seconds, one minute, five minutes, and/or any other suitable duration). For example, in some embodiments, notification 152 and/or icon 154 can be inhibited from presentation after a predetermined duration of time (e.g., five seconds, one minute, five minutes, and/or any other suitable duration of time) has elapsed. As another example, in some embodiments, notification 152 and/or icon 154 can be inhibited from presentation if it is determined that a dominant topic or theme of messages 106-112 has changed and is no longer relevant to notification 152 and/or icon 154. As yet another example, in some embodiments, notification 152 and/or icon 154 can be dismissed by the creator of video content 102, for example, by swiping, clicking, or dragging notification 152 and/or icon 154 off video content 102.

Figure 2A:
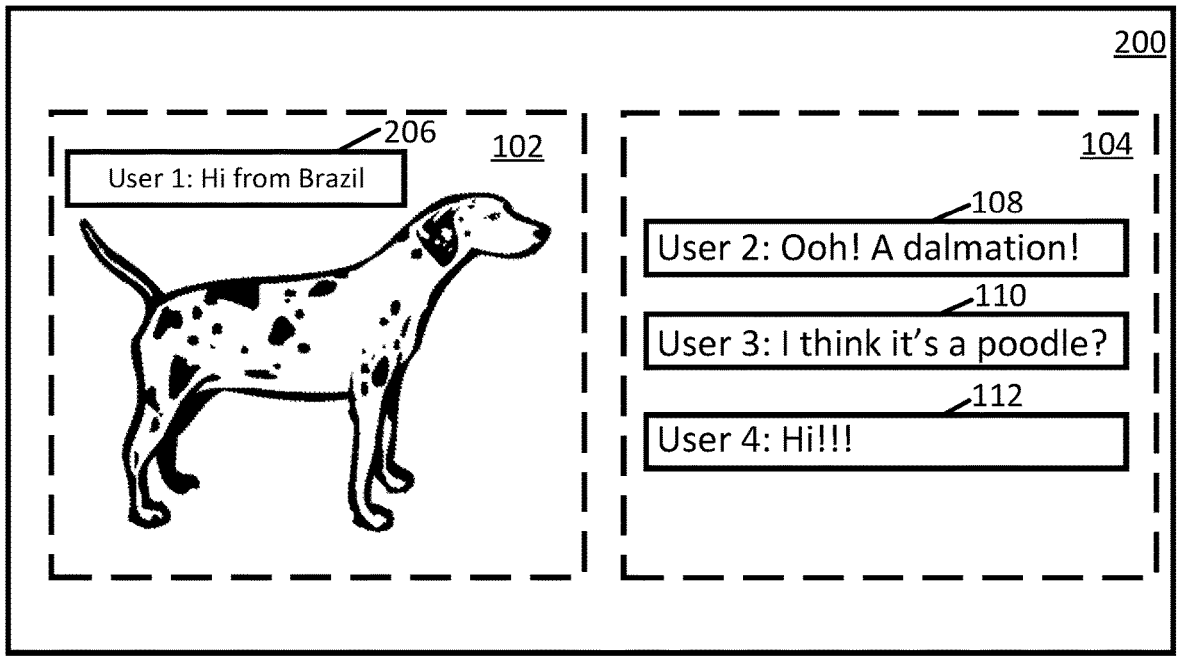
FIGS. 2A and 2B show illustrative examples of user interfaces for presenting messages and results of an analysis of the messages to a creator of a video content item in accordance with some embodiments of the disclosed subject matter.
Figure 2B:
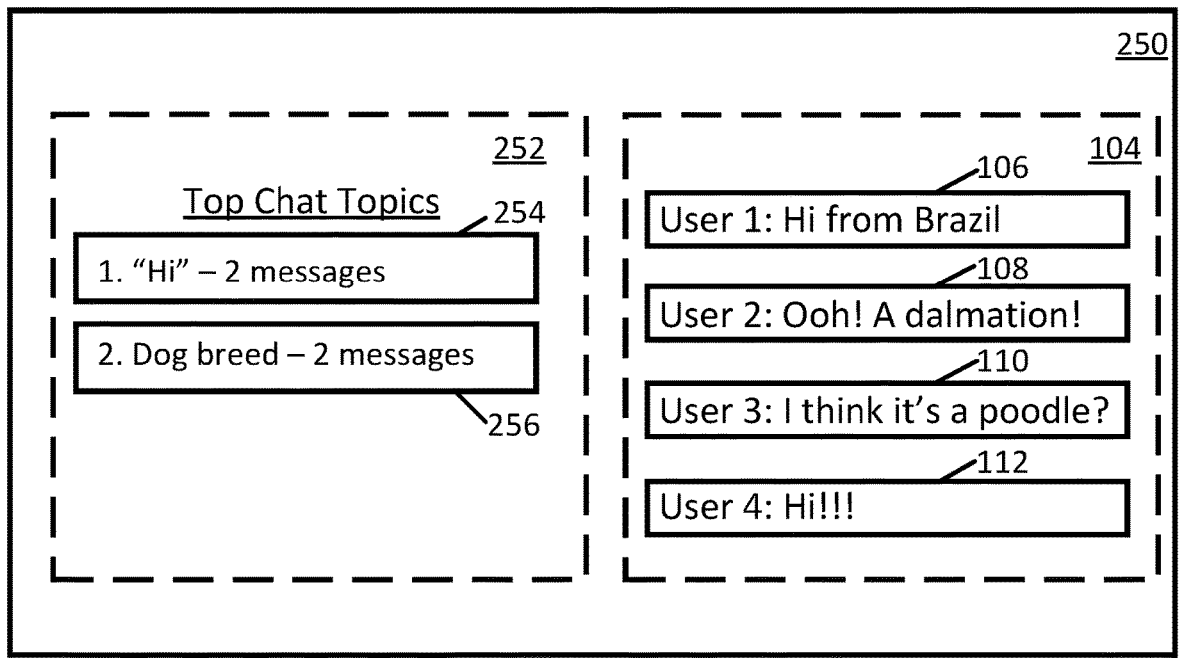

Turning to FIGS. 2A and 2B, examples 200 and 250 of user interfaces for allowing a creator of a video content item to view and interact with messages are shown in accordance with some embodiments of the disclosed subject matter.

In some embodiments, user interface 200 can be used to allow a content creator to select a particular message and cause the selected message to be pinned, thereby allowing the selected message to be viewed even if additional messages are received in message interface 104 that would displace the selected message in message interface 104. For example, as shown in FIG. 2A, a user of user interface 200 (e.g., a creator of video content 102, and/or any other suitable user) can select message 206 and can cause message 206 to be superimposed on video content 102. In some embodiments, the message can be selected in any suitable manner. For example, in some embodiments, user of user interface 200 can touch, tap, and/or click a message in message interface 104 and can then drag the selected message to a particular position where the user would like to pin the selected message. Note that, in some embodiments, the user of user interface 200 can select a message from message interface 104 and can cause the selected message to be pinned within message interface 104 rather than superimposed on video content 102.

Note that, in some embodiments, the user of user interface 200 can modify a selected message in any suitable manner, for example, by editing text in the selected message, adding text to the selected message, adding any suitable content (e.g., links, images, icons, animations, graphics, and/or any other suitable content), and/or modifying the selected message in any other suitable manner.

In some embodiments, messages in message interface 104 can be analyzed, and results of the analysis can be presented in user interface 250 as shown in FIG. 2B. In some embodiments, user interface 250 can be presented on a particular user device, for example, on a user device associated with a creator of video content 102. As illustrated in FIG. 2B, in some embodiments, user interface 250 can include a results panel 252.

In some embodiments, results panel 252 can include any suitable information. For example, as shown in FIG. 2B, results panel 252 can include an indication of topics or keywords that are most popular in the messages of message interface 104. As a more particular example, in some embodiments, results panel 252 can indicate a top N (e.g., one, two, five, ten, and/or any other suitable number) of topics or keywords in the messages of message interface 104, for example, in topics 254 and 256. In some embodiments, topics 254 and/or 256 can additionally indicate a number of messages associated with each of topics 254 and/or 256. Additionally, in some embodiments, topics 254 and/or 256 can be selectable, and in response to be selected, can cause individual messages corresponding to the selected topic to be presented. As a particular example corresponding to user interface 250, in an instance where topic 254 corresponding to the topic "Hi" is selected, messages 106 and/or 112 can be presented, thereby allowing messages to be grouped based on topic. Note that, in some embodiments, results panel 252 can be updated at any suitable frequency (e.g., every minute, every two minutes, every five minutes, and/or at any other suitable frequency).

In some embodiments, results panel 252 can include any other suitable information. For example, in some embodiments, results panel 252 can include information about participants in message interface 104, such as a total number of participants, countries of origin of the participants, and/or any other suitable information. As another example, in some embodiments, results panel 252 can include information indicating a general sentiment of the messages of message interface 104. As a more particular example, in instances where analysis of the messages indicates a generally positive sentiment, results panel 252 can indicate a thumbs-up icon, a smiley face icon, any suitable data conveying the positive sentiment, and/or any other suitable information. As another more particular example, in some embodiments, results panel 252 can include a word cloud based on content (e.g., words included in text of the messages, common icons included in the messages, links to sites included in the messages, and/or any other suitable type of content) of the messages in message interface 104. In some embodiments, results panel 252 can include any other suitable information, such as indicating links that have been included in one or more received messages, indications of messages that have been positively or negatively rated by other viewers, and/or any other suitable information.

Figure 3:
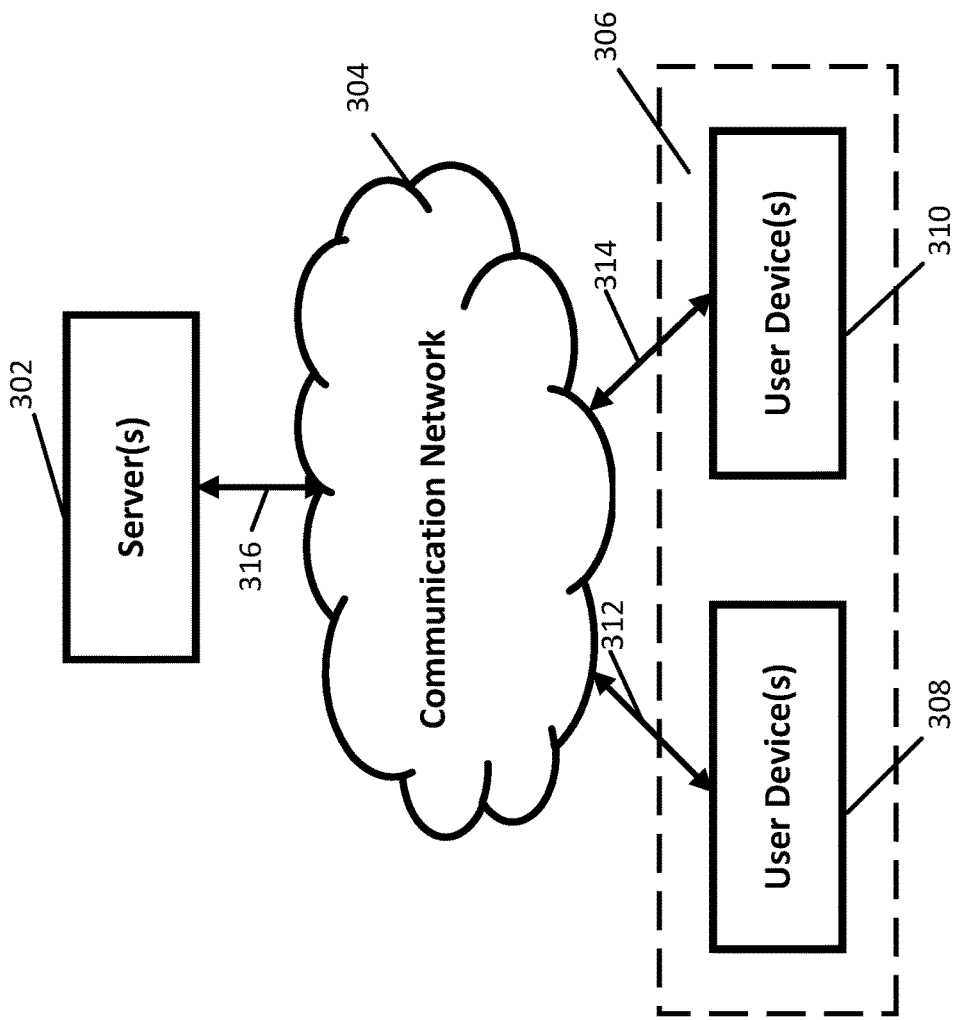
FIG. 3 shows a schematic diagram of an illustrative system suitable for implementation of mechanisms described herein for generating a notification in connection with video content in accordance with some embodiments of the disclosed subject matter.

Turning to FIG. 3, an example of an illustrative system 300 suitable for implementation of mechanisms described herein for generating a notification is shown in accordance with some embodiments of the disclosed subject matter is shown. As illustrated, hardware 300 can include one or more servers, such as a server 302, a communication network 304, and/or one or more user devices 306, such as user devices 308 and 310.

In some embodiments, server(s) 302 can be any suitable server(s) for causing a live video content item to be presented on multiple user devices, receiving messages from the multiple user devices, analyzing content of the received messages, causing a notification related to the received messages to be superimposed on the presentation of the video content item, and/or performing any other suitable functions. For example, as described below in connection with FIG. 5, server(s) 302 can perform any suitable language processing to determine common topics or keywords in received messages and can cause an indication of identified topics or keywords to be presented to a creator of the video content item. As another example, in some embodiments, server(s) 302 can cause a notification indicating a common sentiment, topic, or keyword in multiple received messages to be embedded in and/or superimposed on the video content item during presentation on the multiple user devices. In some embodiments, server(s) 302 can be omitted.

Communication network 304 can be any suitable combination of one or more wired and/or wireless networks in some embodiments. For example, communication network 306 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 306 can be connected by one or more communications links 312 to communication network 304 that can be linked via one or more communications links (e.g., communications link 314) to server(s) 302. Communications links 312 and/or 314 can be any communications links suitable for communicating data among user devices 306 and server(s) 302 such as network links, dial-up links, wireless links, hard-wired links, any other suitable communications links, or any suitable combination of such links.

In some embodiments, user devices 306 can include one or more computing devices suitable for presenting a video content item, presenting a message interface in connection with the presentation of the video content item, receiving messages from a user of the user device, transmitting received messages to server(s) 302, and/or any other suitable functions. For example, in some embodiments, user devices 306 can be implemented as a mobile device, such as a smartphone, mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 306 can be implemented as a non-mobile device such as a desktop computer, a set-top box, a television, a streaming media player, a game console, and/or any other suitable non-mobile device.

Although server 302 is illustrated as a single device, the functions performed by server 302 can be performed using any suitable number of devices in some embodiments. For example, in some embodiments, the functions performed by server 302 can be performed on a single server. As another example, in some embodiments, multiple devices can be used to implement the functions performed by server 302.

Although two user devices 308 and 310 are shown in FIG. 3, any suitable number of user devices, and/or any suitable types of user devices, can be used in some embodiments.

Figure 4:
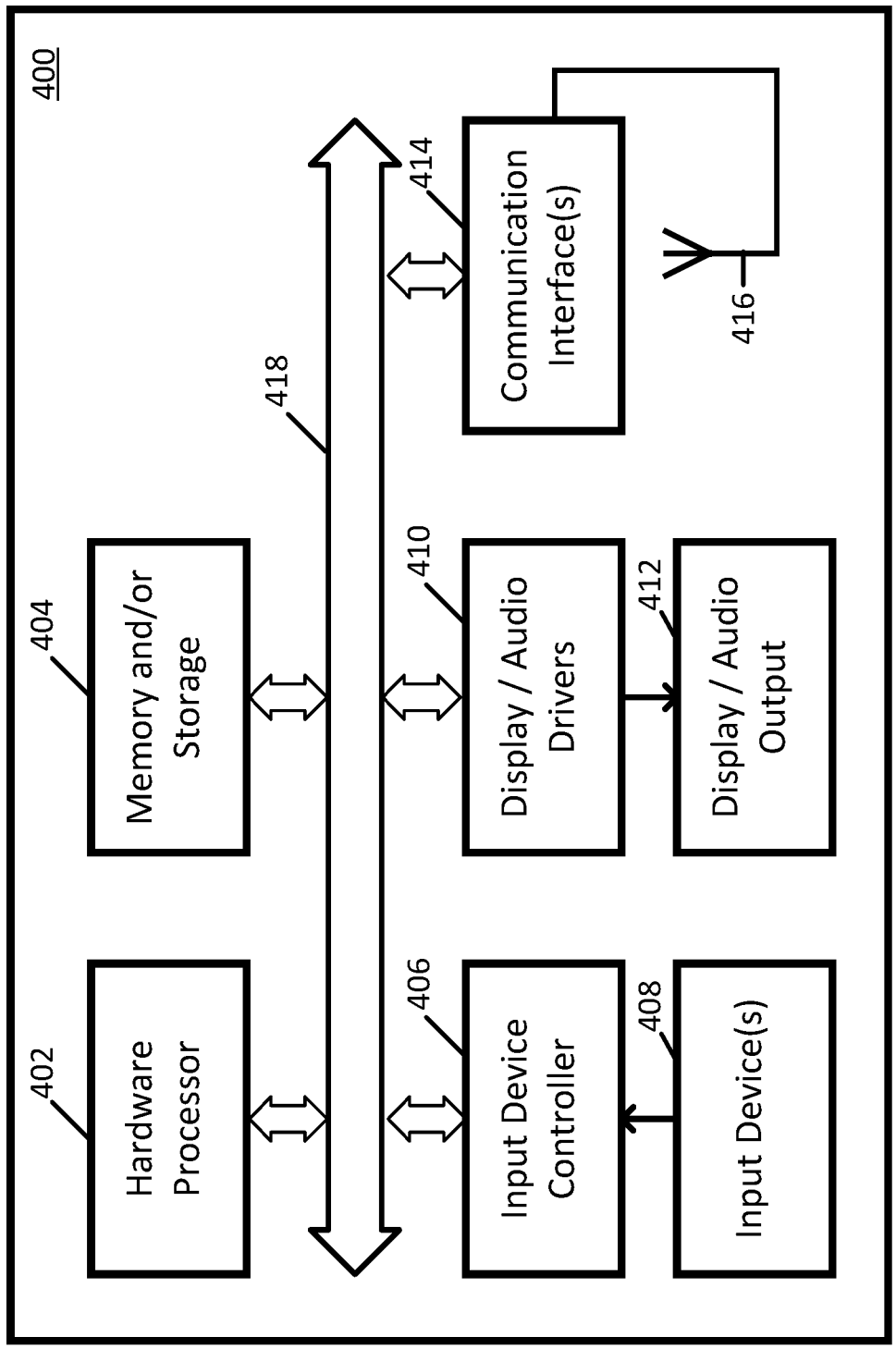
FIG. 4 shows a detailed example of hardware that can be used in a server and/or a user device of FIG. 3 in accordance with some embodiments of the disclosed subject matter.

Server(s) 302 and user devices 306 can be implemented using any suitable hardware in some embodiments. For example, in some embodiments, devices 302 and 306 can be implemented using any suitable general purpose computer or special purpose computer. For example, a server may be implemented using a special purpose computer. Any such general purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, message interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 402 can be controlled by a server program stored in memory and/or storage 404 of a server (e.g., such as server 302). For example, the server program can cause hardware processor 402 to analyze content or sentiment across multiple received messages and can present results of the analysis to a creator of a video content item and/or perform any other suitable actions. In some embodiments, hardware processor 402 can be controlled by a computer program stored in memory and/or storage 404 of user device 306. For example, the computer program can cause hardware processor 402 to present a video content item and a message interface associated with the video content item, receive messages from a user of the user device, transmit the received messages to server(s) 302, and/or perform any other suitable actions.

Memory and/or storage 404 can be any suitable memory and/or storage for storing programs, data, media content, advertisements, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device. In another example, input device controller 406 can be circuitry for receiving input from a head-mountable device (e.g., for presenting virtual reality content or augmented reality content).

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks, such as network 304 as shown in FIG. 3. For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

Figure 5:
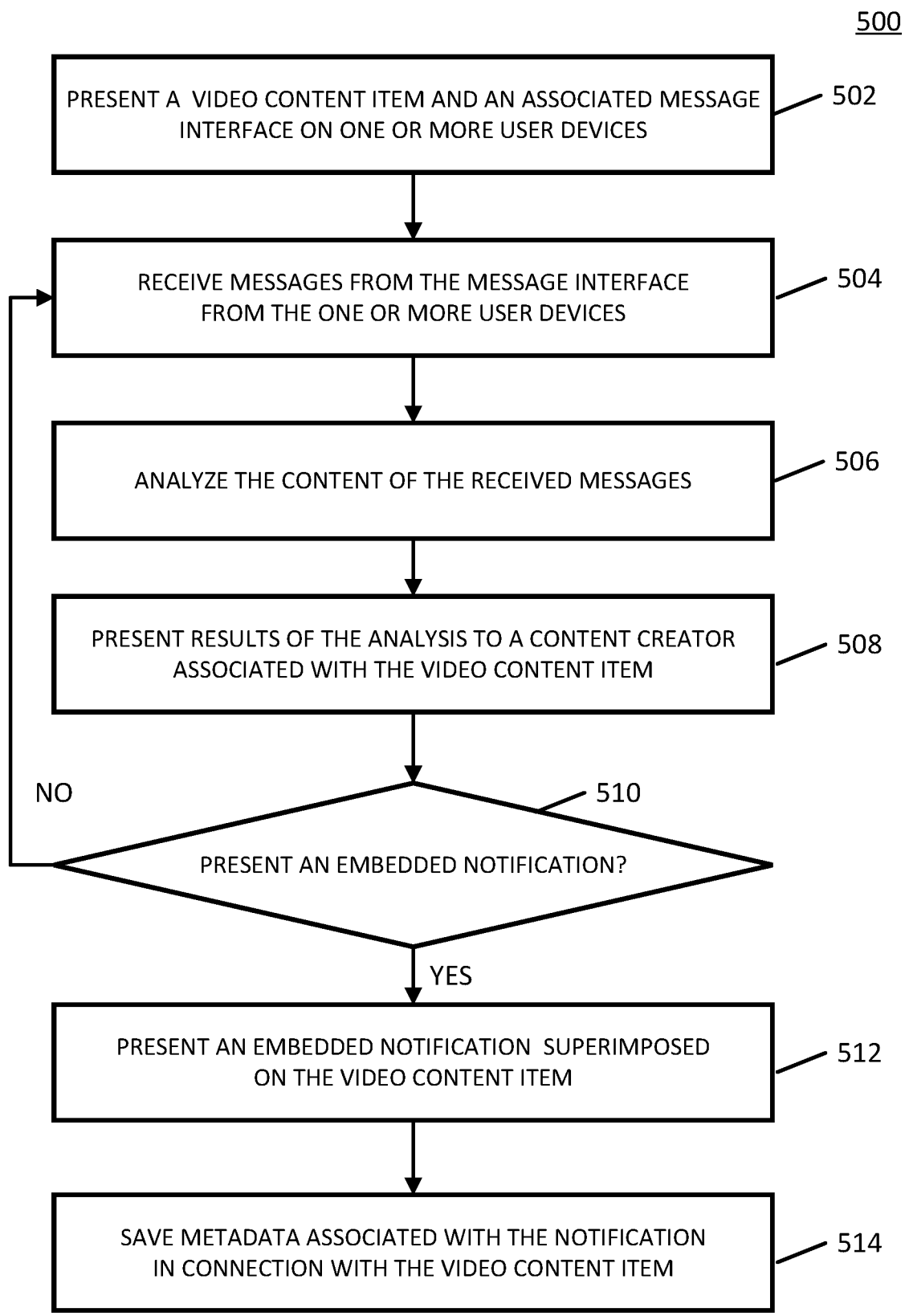
FIG. 5 shows an illustrative example of a process for analyzing content in received messages and presenting a notification in accordance with some embodiments of the disclosed subject matter.

Turning to FIG. 5, an example 500 of a process for analyzing messages related to a video content item and presenting a notification associated with the received messages within the video content item is shown in accordance with some embodiments of the disclosed subject matter. In some embodiments, blocks of process 500 can be implemented on server(s) 302 and/or user devices 306.

Process 500 can begin by causing a video content item to be presented on one or more user devices at 502. Additionally, in some embodiments, process 500 can cause a message interface to be presented on the one or more user devices. In some embodiments, the video content item and the message interface can be presented in any suitable manner, as shown in FIGS. 1A and 1B. In some embodiments, the message interface can present messages transmitted by different user devices that are each presenting the video content item. In some embodiments, the video content item can be any suitable type of video content, such as live-streamed content, a television program, a movie, and/or any other suitable content.

Process 500 can receive messages received via the message interface from one or more user devices at 504. Process 500 can receive any suitable number (e.g., one, two, five, twenty, one hundred, and/or any other suitable number) of messages from any suitable number (e.g., one, two, five, ten, twenty, one hundred, and/or any other suitable number) of user devices. In some embodiments, the messages can include any suitable content, such as text, icons, images, graphics, animations, hyperlinks, and/or any other suitable content. In some embodiments, process 500 can cause received messages to be stored in any suitable location, such as in memory 404 of server(s) 302. Note that, in some embodiments, the received messages can be included in a chat among viewers of the video content item, as shown in and described above in connection with FIGS. 1A and 1B.

Note that, as shown in and described above in connection with FIG. 2A, the received messages can be presented to a creator of the video content item (e.g., on a user device that has authenticated a user account associated with upload of the video content item). In some embodiments, the received messages can be presented within a user interface as shown in FIG. 2A. In some such embodiments, the creator of the video content item can interact with individual received messages, for example, by selecting and dragging a particular message to a particular position (e.g., superimposed on the video content item as shown in FIG. 2A, and/or any other suitable position), which can then be presented on the user devices presenting the video content item at the selected position. As another example, in some embodiments, the creator of the video content item can use the user interface to pin a particular message such that the message remains in the message interface even as additionally received messages are presented in the message interface. As yet another example, in some embodiments, the creator of the video content item can use the user interface to dismiss or remove particular messages or particular messages that are superimposed on the video content item at any suitable time. As still another example, in some embodiments, the creator of the video content item can use the user interface to interact with particular messages by replying to the message, endorsing the message (e.g., by selecting an icon indicating that the creator likes or supports the message), and/or interact with the message in any other suitable manner. Note that, in some embodiments, the user interface can additionally allow the content creator to modify a message prior to superimposing the message on the video content item and/or pinning a particular message. For example, in some embodiments, the content creator can edit text, insert any suitable images, icons, graphics, and/or links, and/or modify the message in any suitable manner.

Process 500 can analyze the content of the received messages at 506 using any suitable technique or combination of techniques. In some embodiments, the analysis of the received messages can indicate currently popular topics being discussed in the received messages. For example, in some embodiments, process 500 can identify one or more commonly occurring words that indicate a topic or keyword associated with the received messages. As a more particular example, in some embodiments, process 500 can identify the top N (e.g., one, two, five, ten, and/or any other suitable number) most commonly occurring words in the received messages, and can identify a subset of the top N words as popular or trending topics. In some embodiments, process 500 can exclude any suitable words or types of words from the top N words (e.g., prepositions, articles such as "a" or "the," and/or any other suitable types of words).

As another example, in some embodiments, process 500 can identify one or more popular sentiments of the received messages. As a more particular example, process 500 can determine if the received messages are generally directed to a particular sentiment or emotion such as enjoying the presented video content, excitement, anger, boredom with the presented video content, and/or any other suitable sentiment or emotion. In some embodiments, process 500 can use any suitable information to identify the one or more popular sentiments. For example, in some embodiments, process 500 can identify one or more emojis (e.g., smiley faces, angry faces, and/or any other suitable emojis) that have been included in messages more than a predetermined number of times. As another example, in some embodiments, process 500 can identify one or more words related to common sentiments (e.g., happiness, excitement, sadness, anger, and/or any other suitable sentiments) that have occurred more than a predetermined number of times in the received messages.

In some embodiments, process 500 can use any suitable natural language processing and/or sentiment analysis technique(s) to identify topics or keywords, sentiments, and/or any other suitable information associated with the received messages. Note that, in some embodiments, process 500 can analyze messages received over any suitable time period. For example, in some embodiments, process 500 can receive messages received within the past minute, past two minutes, past five minutes, and/or any other suitable time period to identify current trends or currently popular topics of conversation within the received messages. In some such embodiments, process 500 can repeat the analysis at any suitable frequency (e.g., once per minute, every two minutes, every five minutes, and/or any other suitable frequency).

Note that, in some embodiments, process 500 can analyze messages sent by a subset of participants in the message interface. For example, in some embodiments, process 500 can analyze messages sent from user accounts that have been indicated by a creator of the video content item. As another example, in some embodiments, process 500 can analyze messages that have received more than a predetermined number of endorsements and/or other engagement (e.g., more than a predetermined number of other users indicating that they like the message, more than a predetermined number of replies or shares of the message, and/or any other suitable metric). In some embodiments, the subset of participants can include any suitable number of participants (e.g., one, two, five, ten, twenty, fifty, one hundred, and/or any other suitable number).

Process 500 can cause the results of the analysis of the received messages to be presented to a creator of the video content item at 508. In some embodiments, as shown in and described above in connection with FIG. 2B, the results of the analysis can be presented in a user interface presented to the creator of the video content item (e.g., on a user device that has authenticated a user account used to upload the video content item, and/or any other suitable user device corresponding to the content creator). In some embodiments, any suitable results of the analysis can be presented to the content creator in any suitable manner. For example, in some embodiments, a group of most popular topics and/or keywords can be presented. As another example, in some embodiments, the user interface can indicate a number of times different topics or keywords have been discussed within a predetermined time range (e.g., within the last minute, within the last five minutes, and/or any other suitable time range).

Process 500 can determine whether to present a notification at 510. In some embodiments, the determination can be based on any suitable information and using any suitable technique(s). For example, in some embodiments, process 500 can suggest, to the content creator, an embedded notification based on the results of the analysis at block 506, and can determine whether the suggested embedded notification is to be presented based on a response from the content creator. As a more particular example, in some embodiments, process 500 can present a suggestion that indicates a currently popular topic, keyword, and/or sentiment, and can determine the currently popular topic, keyword, and/or sentiment is to be presented as part of the notification in response to determining that the content creator has accepted the suggestion. Additionally, in some embodiments, the suggestion can indicate a number of times the suggested topic, keyword, and/or sentiment has been expressed in the received messages. Specific examples of suggested topics, keywords, and/or sentiments can include common content (e.g., text, characters, emojis, images, icons, links, and/or any other suitable type of content) in multiple received messages, such as "hi," "awesome," "so boring," "not true," a particular topic (e.g., discussion of a particular entity or theme, and/or any other suitable topic), and/or any other suitable topics or keywords. Continuing with this example, in some embodiments, the suggestion can indicate a number of times the suggested topic or sentiment has been expressed (e.g., "awesome (×10)," indicating that the sentiment "awesome" was received in ten messages). Note that, in some embodiments, a response from the content creator to the suggestion can include any suitable modifications to the suggestion that can be applied to the suggested embedded notification prior to presentation. For example, in some embodiments, the modifications can include additions or removals of particular words, inserting any suitable content (e.g., icons, graphics, animations, images, links, and/or any other suitable content), setting or changing a font or font size of the embedded notification, setting a position at which the embedded notification is to be positioned, and/or any other suitable information.

Note that, in some embodiments, the content creator can indicate that a particular message is to be featured as an embedded notification even if the particular message was not suggested by process 500. For example, as shown in and described above in connection with FIG. 2A, in some embodiments, the content creator can select a particular message to be an embedded notification. In some such embodiments, process 500 can determine whether to present an embedded notification based on receiving an indication from the content creator (e.g., via a user interface such as user interface 250) that a particular message has been selected to be presented as the embedded notification.

As another example, in some embodiments, process 500 can determine whether to present an embedded notification based on whether the number of received messages that include a particular topic, keyword, and/or sentiment exceeds a predetermined threshold (e.g., more than five messages, more than ten messages, and/or any other suitable number). Note that, in some embodiments, process 500 can identify any suitable synonyms across received messages prior to determining if a particular topic, keyword, and/or sentiment exceeds the predetermined threshold. As a specific example, in some embodiments, if five received messages include the word "great," and three received messages include the word "awesome," process 500 can determine that eight messages relate to the sentiment of "great."

Note that, in some embodiments, process 500 can additionally or alternatively suggest any other suitable content for inclusion as an embedded notification. For example, in instances where a particular topic or keyword is determined to be a currently popular topic in the messages, process 500 can determine a relevant link or website related to the identified topic or keyword and can suggest that the content creator post the link as an embedded notification in connection with the video content item. Alternatively, in some embodiments, process 500 can automatically determine that the link is to be presented as an embedded notification in connection with the video content item. As another example, in some embodiments, process 500 can identify an icon, graphic, meme, animation, and/or any other suitable visual content for inclusion as an embedded notification in connection with the video content item. As a specific example, in some embodiments, process 500 can identify one or more emojis that correspond to an identified currently popular sentiment in the received messages.

If, at block 510, process 500 determines that an embedded notification is not to be presented ("no" at 510), process 500 can loop back to block 504 and continue receiving messages from the one or more user devices presenting the video content item.

If, at block 510, process 500 determines that an embedded notification is to be presented ("yes" at 510), process 500 can cause the embedded notification to be presented in connection with the video content item at 512. For example, as shown in FIGS. 1A and 2A, the embedded notification can be superimposed on the video content item. In some embodiments, the embedded notification can be superimposed on the video content item at a position selected by the content creator, as described above in connection with FIG. 2A. Additionally or alternatively, in some embodiments, the embedded notification can be presented at a position selected by process 500. For example, in some embodiments, process 500 can identify a suitable position to present the embedded notification based on a size of the embedded notification and an identification of a portion of the video content item that does not contain relatively important video content. As a more particular example, in some embodiments, process 500 can identify the position based on motion information (e.g., identifying a spatial position of one or more frames of the video content item that contains relatively less motion), color information (e.g., identifying a spatial position of one or more frames of the video content item that contains relatively less color variation), and/or based on any other suitable information. Note that, in some embodiments, a size of a visual representation of the notification can be based on a popularity of a topic, keyword, and/or sentiment associated with the embedded notification. For example, in some embodiments, embedded notifications associated with topics, keywords, and/or sentiments that have been more frequently mentioned in messages can be presented in a larger size (e.g., within a larger bubble or box, with a larger font size, and/or in any other suitable manner) relative to topics, keywords, and/or sentiments that have been mentioned fewer times.

In some embodiments, a size of the visual representation of the notification can be determined in any suitable manner. For example, in some embodiments, a font size, a size of a bubble or box within which the notification is presented, and/or any other suitable presentation parameters can be determined from a template or look-up table. As a more particular example, in some embodiments, the template or look-up table can specify presentation parameters (e.g., font size, a size of a bubble or box within which the notification is presented, and/or any other suitable information) for a particular level of popularity of the topic, keyword, and/or sentiment. As a specific example, the template or look-up table can specify a particular font size for text of the notification if the content of the notification is associated with a number of messages within a first predetermined range (e.g., between 10 and 20 messages), and a second font size if the content of the notification is associated with a number of messages within a second predetermined range (e.g., between 50 and 100 messages).

Note that, in some embodiments, the embedded notification can be presented in connection with any suitable number of frames of the video content item. Furthermore, in some embodiments, the number of frames can be determined based on input from the creator of the video content item (e.g., based on a frame at which the creator dismisses and/or closes the embedded notification) and/or based on a determination that the topic and/or sentiment associated with the embedded notification is no longer relevant to the messages in the message interface. For example, in some embodiments, process 500 can update an analysis of received messages and determine that a topic, keyword, and/or sentiment associated with the embedded notification is no longer a popular topic, keyword, and/or sentiment associated with more recently received messages. In some embodiments, when an embedded notification is no longer presented at a particular frame or time point of the video content item, process 500 can cause the embedded notification to disappear with any suitable animation (e.g., fading, floating off a screen, and/or in any other suitable manner).

Process 500 can cause the embedded notification to be presented in connection with the video content item on the multiple user devices presenting the video content item in any suitable manner. For example, in some embodiments, process 500 can generate a composite video stream that includes the embedded notification (e.g., a set of video frames that each include video content and the superimposed notification) and transmit the composite video stream to the multiple user devices. Alternatively, in some embodiments, process 500 can transmit, to the user devices, metadata that indicates information about the embedded notification along with instructions for rendering the embedded notification based on the metadata, and the embedded notification can be rendered by each of the user devices using the instructions and the metadata. For example, in some embodiments, the metadata can indicate the content of the embedded notification, a size of the embedded notification, a position at which the embedded notification is to be presented relative to the video content item, one or more frames of the video content item at which the embedded notification is to be presented, and/or any other suitable information. In some such embodiments, process 500 can later transmit an instruction to the user devices to inhibit presentation of the embedded notifications at a suitable time (e.g., a time point indicated by the content creator based on explicit input, a time point determined by process 500 based on an updated analysis of the messages, and/or any other suitable time point).

At 514, process 500 can store any suitable metadata associated with the embedded notification in connection with an identifier of the video content item. For example, in some embodiments, the metadata can indicate the content of the embedded notification (e.g., text, images, icons, graphics, images, animations, and/or links included in the embedded notification), a size of the embedded notification, a position of the embedded notification, a temporal portion of the video stream during which the embedded notification was presented (e.g., during frames 10-50, during time 1:00-2:00, and/or any other suitable timing information), and/or any other suitable information. Note that, in some embodiments, the stored metadata can be used to present the embedded notification in connection with any future presentation of the video content item. For example, in instances where the video content item is a live-streamed video content item, the embedded notification can be presented during later presentations of the recorded video content item after presentation of the live stream has finished.

Note that, in some embodiments, a user viewing the presentation of the video content item can request that presentation of embedded messages be disabled at any suitable time. For example, in some embodiments, a user can set a preference for enabling or disabling embedded messages via a settings user interface associated with a provider of the video content item.

In some embodiments, at least some of the above described blocks of the process of FIG. 5 can be executed or performed in any order or sequence not limited to the order and sequence shown in and described in connection with the figure. Also, some of the above blocks of FIG. 5 can be executed or performed substantially simultaneously where appropriate or in parallel to reduce latency and processing times. Additionally or alternatively, some of the above described blocks of the process of FIG. 5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for generating a notification in connection with a video content item are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for generating a notification in connection with video content, the method comprising:
causing a video content item and a message interface to be presented on a plurality of user devices, wherein the video content item is created by a content creator;
receiving, from at least a portion of the plurality of user devices, a plurality of messages via the message interface;
identifying at least one topic included in a portion of the plurality of messages within a given period of time;
generating a notification that indicates the at least one topic to be superimposed on the presentation of the video content item on the plurality of user devices;
storing metadata that indicates the notification and indicates a time period of the video content item during which the notification is to be presented; and
inhibiting the notification from being presented in response to determining that the at least one topic is no longer included in more than a predetermined number of the plurality of messages.

2. The method of claim 1, wherein a plurality of topics from the plurality of messages are identified within the given period of time and wherein the method further comprises causing a creator interface to be presented on a user device associated with the content creator, wherein at least a subset of the plurality of topics are presented within the creator interface.

3. The method of claim 2, further comprising receiving a selection, via the creator interface, from the content creator, of the notification from the plurality of messages.

4. The method of claim 2, further comprising ranking the plurality of topics that are presented within the creator interface based on message popularity.

5. The method of claim 1, wherein identifying the at least one topic further comprises determining that a keyword is included in more than the predetermined number of the plurality of messages.

6. The method of claim 1, further comprising determining a size of a visual representation of the notification based on a number of the plurality of messages that include the at least one topic.

7. The method of claim 1, wherein the notification indicates a number of the plurality of messages that include the at least one topic.

8. The method of claim 1, wherein causing the notification to be superimposed on the presentation of the video content item further comprises generating a composite video content item that includes the notification.

9. A system for generating a notification in connection with video content, the system comprising:
a hardware processor that is programmed to:
cause a video content item and a message interface to be presented on a plurality of user devices, wherein the video content item is created by a content creator;
receive, from at least a portion of the plurality of user devices, a plurality of messages via the message interface;
identify at least one topic included in a portion of the plurality of messages within a given period of time;
generate a notification that indicates the at least one topic to be superimposed on the presentation of the video content item on the plurality of user devices;
store metadata that indicates the notification and indicates a time period of the video content item during which the notification is to be presented; and
inhibit the notification from being presented in response to determining that the at least one topic is no longer included in more than a predetermined number of the plurality of messages.

10. The system of claim 9, wherein a plurality of topics from the plurality of messages are identified within the given period of time and wherein the hardware processor is further configured to cause a creator interface to be presented on a user device associated with the content creator, wherein at least a subset of the plurality of topics are presented within the creator interface.

11. The system of claim 10, wherein the hardware processor is further configured to receive a selection, via the creator interface, from the content creator, of the notification from the plurality of messages.

12. The system of claim 10, wherein the hardware processor is further configured to rank the plurality of topics that are presented within the creator interface based on message popularity.

13. The system of claim 9, wherein identifying the at least one topic further comprises determining that a keyword is included in more than the predetermined number of the plurality of messages.

14. The system of claim 9, where the hardware processor is further configured to determine a size of a visual representation of the notification based on a number of the plurality of messages that include the at least one topic.

15. The system of claim 9, wherein the notification indicates a number of the plurality of messages that include the at least one topic.

16. The system of claim 9, wherein causing the notification to be superimposed on the presentation of the video content item further comprises generating a composite video content item that includes the notification.

17. A non-transitory computer-readable medium containing computer executable instructions that, when executed by a processor, cause the processor to execute a method for generating a notification in connection with video content, the method comprising:
causing a video content item and a message interface to be presented on a plurality of user devices, wherein the video content item is created by a content creator;
receiving, from at least a portion of the plurality of user devices, a plurality of messages via the message interface;
identifying at least one topic included in a portion of the plurality of messages within a given period of time;
generating a notification that indicates the at least one topic to be superimposed on the presentation of the video content item on the plurality of user devices;
storing metadata that indicates the notification and indicates a time period of the video content item during which the notification is to be presented; and
inhibiting the notification from being presented in response to determining that the at least one topic is no longer included in more than a predetermined number of the plurality of messages.

* * * * *